Dec. 31, 1963 B. M. MEYEROTTO 3,115,867
ANTI-FENCE-JUMPING ATTACHMENT FOR DOGS
Filed July 13, 1962
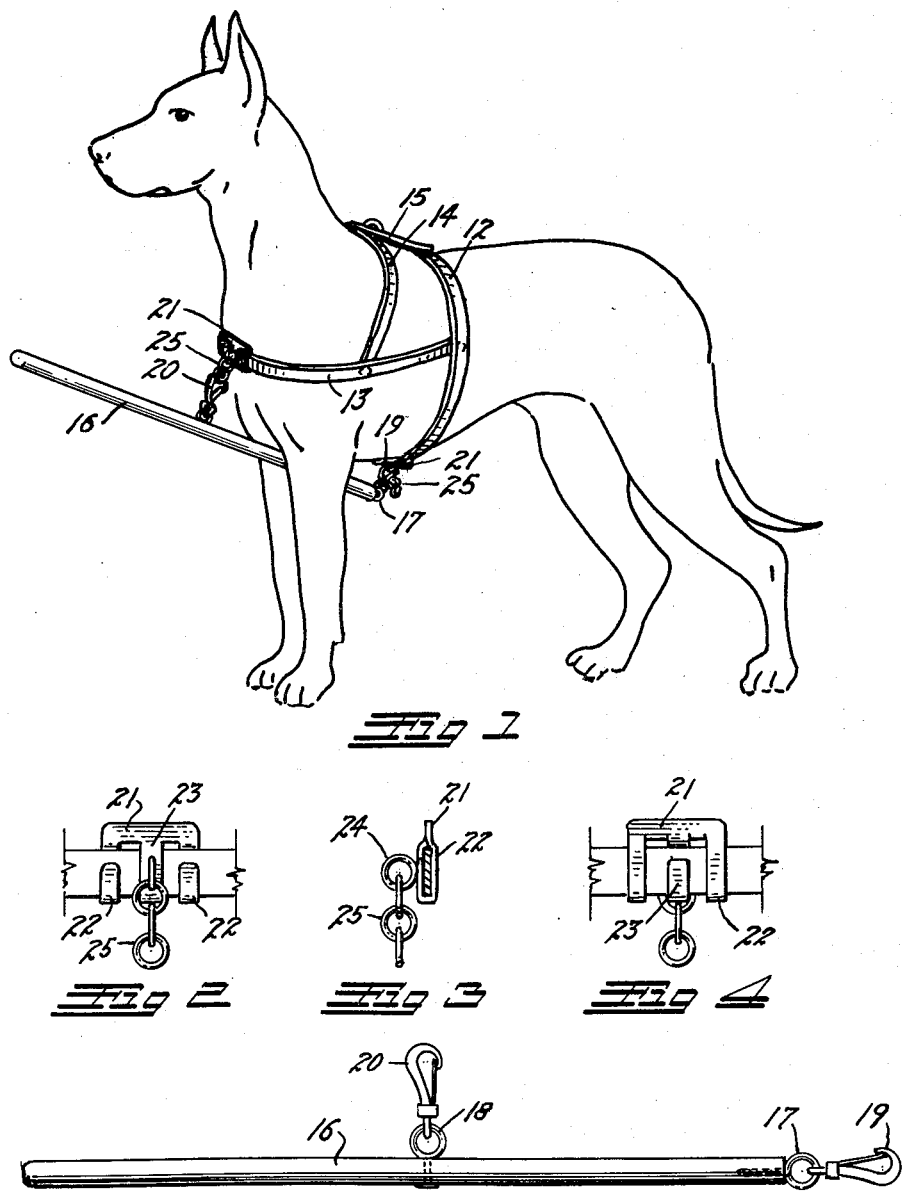
INVENTOR.
BEATRICE M. MEYEROTTO
BY
ATTORNEY

United States Patent Office 3,115,867
Patented Dec. 31, 1963

3,115,867
ANTI-FENCE-JUMPING ATTACHMENT FOR DOGS
Beatrice M. Meyerotto, 799 Victor St., Aurora, Colo.
Filed July 13, 1962, Ser. No. 209,610
1 Claim. (Cl. 119—137)

This invention relates to a harness for dogs and has for its principal object the provision of a harness of a type which will discourage, restrict and prevent a dog from escaping from yards and other enclosures by jumping the surrounding fence or wall.

Another object is to provide a simple, economical, and highly efficient anti-fence-jumping attachment which can quickly and easily be applied to a conventional dog harness when the dog is to be confined by a fence and which can be instantly removed from the harness when no longer required.

A further object is to provide an anti-fence-jumping attachment for dogs which will eliminate the necessity for tying or leashing the dog, which will not interfere with the normal activities of the dog, and which will not injure the dog in any way.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

FIG. 1 illustrates the improved anti-fence-jumping attachment in place upon a dog;

FIG. 2 is a fragmentary outside face view of an attachment fitting employed for attaching the attachment to the straps of a conventional dog harness showing the attachment in place on a strap;

FIG. 3 is a cross-section through the strap showing the attachment in place thereon;

FIG. 4 is a fragmentary inside face view of the attachment and strap; and

FIG. 5 is a side view of a staff as used in the attachment.

The invention can be supplied as a complete dog harness or can be supplied as an attachment for present dog harnesses. A conventional dog harness is shown in FIG. 1 consisting of a body strap 12, a chest strap 13, a shoulder strap 14 and a saddle strap 15. The body strap is provided with a suitable buckle (now shown) for tightening it about the body of the dog. The chest strap is riveted or otherwise secured at its rear extremities to the body strap 12 and the shoulder strap 14 crosses the shoulders of the dog and is riveted or otherwise secured at its lower extremities to the chest strap 13 forwardly of the body strap 12. The saddle strap 15 secures the medial portions of the straps 12 and 14 and provides means for attaching a leash to the harness.

The anti-fence-jumping harness attachment of this invention attaches to the chest strap 13, in front of the dog, and to the body strap 12, below the dog, to support an elongated, pole or staff 16 between the front legs of the dog so that it will project forwardly from the body. The pole 16 is of sufficient length to engage in a fence, when the latter is approached by the dog to prevent the dog from jumping or lifting the fore part of his body preparatory to impelling himself thereover under the impulse of his rear legs.

The staff 16 is preferably a light-weight, rounded, smooth, wooden stick having a rear screw eye 17 threaded into or otherwise mounted on its rear extremity and a side screw eye 18 mounted on and extending sidewardly therefrom at approximately its mid-length. A harness snap 19 is mounted on the rear screw eye 17 and a similar harness snap 20 is mounted on the side screw eye 18.

To attach the staff to the harness, two strap fittings 21, as illustrated in FIGS. 2, 3 and 4, are employed. The fittings are stamped from sheet metal to provide three parallel tongues, two side tongues 22 and a middle tongue 23. The side tongues 22 are bent to extend downwardly behind the strap thence upwardly in a U-shape over the front of the strap, as shown in FIG. 2. The middle tongue is similar except that it extends downwardly on the front of the strap, as shown in FIG. 2, thence upwardly on the back of the strap, as shown in FIG. 4.

An attachment ring 24 is fixedly mounted on the front of the middle tongue 23 from which a plurality of open chain links 25 (preferably three) depend.

To prepare a harness for receiving the staff 16, one of the fittings is mounted at the middle of the chest strap 13 and another at the middle of the body strap 12 and these are left in place on the harness with the chain links depending therefrom.

The staff is attached by simply snapping the snap 19 into one of the links depending from the body strap and similarly snapping the other snap 20 into one of the links depending from the chest strap. The selection of links depends upon the size of the dog and the tightness or looseness of the straps. In any event, links should be selected which will support the staff close against the chest of the dog and at a slight upward angle, as shown in FIG. 1. The staff can be instantly detached by simply unsnapping the snaps 19 and 20.

While a specific form of the invention has been described and illustrated herein, it is to be understood that the same may be varied within the scope of the appended claim, without departing from the spirit of the invention.

Having thus described the invention what is claimed and desired to be secured by Letters Patent is:

The combination with a dog harness of the type having a body strap surrounding the body of a dog and a chest strap extending from the body strap horizontally across the chest of the dog, of an elongated staff; a terminal screw eye in the rear extremity of said staff; a second screw eye secured to said staff intermediate the extremities thereof; a first detachable suspension device mounted on said first screw eye for detachably securing said first screw eye to the body strap of the harness below the body of the dog; and a second detachable suspension device mounted on said second screw eye for detachably attaching said second screw eye to the chest strap of said harness to suspend said staff below said chest strap.

References Cited in the file of this patent

UNITED STATES PATENTS

| | | |
|---|---|---|
| 218,236 | McIntyre | June 25, 1872 |
| 270,843 | Rice | Jan. 16, 1883 |
| 1,295,190 | Morrison | Feb. 25, 1919 |
| 2,219,569 | Vanderhoof | Oct. 29, 1940 |